(12) United States Patent
Bajikar et al.

(10) Patent No.: US 7,800,858 B1
(45) Date of Patent: Sep. 21, 2010

(54) DIFFERENTIAL HEAD INTEGRATED TOUCHDOWN SENSORS FOR HARD DISK DRIVES

(75) Inventors: Sateeshchandra S. Bajikar, San Jose, CA (US); David E. Fowler, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 12/435,298

(22) Filed: May 4, 2009

(51) Int. Cl.
  *G11B 21/02* (2006.01)
  *G11B 5/02* (2006.01)
  *G11B 19/02* (2006.01)
(52) U.S. Cl. ............... 360/75; 360/25; 360/69
(58) Field of Classification Search ............ None
  See application file for complete search history.

(56) References Cited

U.S. PATENT DOCUMENTS

| | | | |
|---|---|---|---|
| 5,527,110 A | 6/1996 | Abraham et al. | |
| 6,088,176 A | 7/2000 | Smith et al. | |
| 6,417,981 B1 | 7/2002 | Smith | |
| 6,452,735 B1 | 9/2002 | Egan et al. | |
| 6,801,376 B2 | 10/2004 | Smith | |
| 7,158,325 B1 | 1/2007 | Hu et al. | |
| 7,280,301 B1 | 10/2007 | Jackson et al. | |
| 7,423,830 B2 | 9/2008 | Ma et al. | |
| 7,436,620 B1 | 10/2008 | Kang et al. | |
| 7,440,220 B1 | 10/2008 | Kang et al. | |
| 7,457,073 B2 | 11/2008 | Kurita et al. | |
| 7,489,466 B2 | 2/2009 | Knigge et al. | |
| 7,492,543 B2 | 2/2009 | Mitsunaga et al. | |
| 7,508,617 B1 | 3/2009 | Mak et al. | |
| 2002/0097513 A1* | 7/2002 | Ng et al. ............... 360/31 |
| 2007/0052088 A1 | 3/2007 | Tsurume et al. | |
| 2007/0077691 A1 | 4/2007 | Watanabe | |
| 2007/0188908 A1 | 8/2007 | Kurita et al. | |
| 2007/0206314 A1 | 9/2007 | DeRosa et al. | |
| 2007/0268615 A1 | 11/2007 | McFadyen et al. | |
| 2008/0084628 A1 | 4/2008 | Ohta et al. | |
| 2008/0100950 A1 | 5/2008 | Mitsunaga et al. | |
| 2008/0100965 A1 | 5/2008 | Oki | |
| 2008/0137225 A1 | 6/2008 | Duan et al. | |
| 2008/0186621 A1 | 8/2008 | Partee | |
| 2008/0212226 A1 | 9/2008 | Uji et al. | |
| 2008/0218891 A1* | 9/2008 | Gubbins et al. ............... 360/59 |
| 2008/0218898 A1 | 9/2008 | Yamashita et al. | |
| 2008/0225426 A1 | 9/2008 | Roy et al. | |
| 2009/0059416 A1 | 3/2009 | Okada et al. | |

OTHER PUBLICATIONS

E. Schreck, et al., "Thin Film Thermocouple Sensors for Measurement of Contact Temperatures During Slider Asperity Interaction on Magnetic Recording Disks", IEEE Transactions on Magnetics, vol. 28, No. 5, Sep. 1992, pp. 2548-2550.

(Continued)

*Primary Examiner*—Andrew L Sniezek

(57) ABSTRACT

A method and system for providing a disk drive is described. The disk drive includes media such as one or more disks, a slider, and a head residing on the slider. The head has an air-bearing surface (ABS), a portion of which contacts the media during touchdown. The head further includes a plurality of touchdown sensors. A first touchdown sensor is proximate to the ABS, while a second touchdown sensor is distal from the ABS. The touchdown sensors are capable of detecting a temperature change of 0.1 degree Celsius or, in some embodiments, smaller.

25 Claims, 4 Drawing Sheets

OTHER PUBLICATIONS

A.H.Z. Ahmed, et al., "Characterization of an Amorphous GexSi1-xOy Microbolometer for Thermal Imaging Applications", IEEE Tranactions on Electron Devices, vol. 52, No. 8, Aug. 2005, pp. 1900-1906.

Lin Han, et al., "A High Performance Uncooled a-Si TFT Infrared Sensor", Proceedings of the 1st IEEE International Conference on Nano/Micro Engineered and Molecular Systems, Jan. 18-21, 2006, Zhuhai, China, pp. 631-634.

Enrique Iborra, et al., IR Uncooled Bolometers Based on Amorphous GexSi1-xOy on Silicon Micromachined Structures, Journal of Microelectromechanical Systems, vol. 11, No. 4, Aug. 2002, pp. 322-329.

A. Torres, et al., "Uncooled micro-bolometer based on amorphous germanium film", Journal of Non-Crystalline Solids, vol. 329 (2003), pp. 179-183.

U.S. Appl. No. 12/435,280 to Fowler et al., filed May 4, 2009, 19 pages.

* cited by examiner

DIFFERENTIAL HEAD INTEGRATED TOUCHDOWN SENSORS FOR HARD DISK DRIVES

CROSS-REFERENCE TO RELATED APPLICATION

This application is related to U.S. patent application Ser. No. 12/435,280, entitled "HEAD INTEGRATED TOUCHDOWN SENSOR FOR HARD DISK DRIVES", filed on the same day as the present application and incorporated herein by reference.

BACKGROUND

Disk drives typically use heads residing on sliders to read from and write to the magnetic media. Read and write transducers residing in the head are flown at a small, controlled spacing above to the magnetic medium during read and write operations. Although generally desired to operate in close proximity to but not touching the disk, the head may also contact the media. This prolonged contact, for example on the order of tens of microseconds or more, is known as touchdown. For example, heads typically use a thermal actuator that generates heat to control the head-media spacing. Heat generated by the thermal actuator causes local thermal expansion of the head, which locally reduces the spacing between the head and magnetic media. The thermal actuator can be driven to induce sufficient heating for contact between the head and media, or touchdown. This touchdown is intentional and is generally performed on each drive during initial drive calibration. Touchdown may also occur at other times during disk drive operation, for example due to changes in environmental conditions, operation of the disk drive outside of desired parameters, or contamination to the head that causes the prolonged contact described above.

Touchdown is detected in the drive operation as well as in testing. Conventional touchdown detection may be performed using a variety of techniques. For example, touchdown may be detected through disk slow down, readout channel noise, strain gauges, and/or acoustic emission. However, no single technique works across all media radii. In addition to detecting touchdown for calibration purposes, it is desirable to accurately detect touchdown in order to limit contact time between the head and disk. This is because prolonged contact is generally undesirable during operation as it may lead to drive failure.

Accordingly, what is needed is a system and method for providing improved touchdown detection.

BRIEF SUMMARY OF THE INVENTION

The disk drive includes media such as one or more disks, a slider, and a head residing on the slider. The head has an air-bearing surface (ABS), a portion of which contacts the media during touchdown. The head further includes a plurality of touchdown sensors. A first touchdown sensor is proximate to the ABS, while a second touchdown sensor is distal from the ABS. The touchdown sensors are capable of detecting a temperature change of 0.1 degree Celsius or, in some embodiments, smaller.

DETAILED DESCRIPTION OF THE PREFERRED EMBODIMENTS

Figure 1:
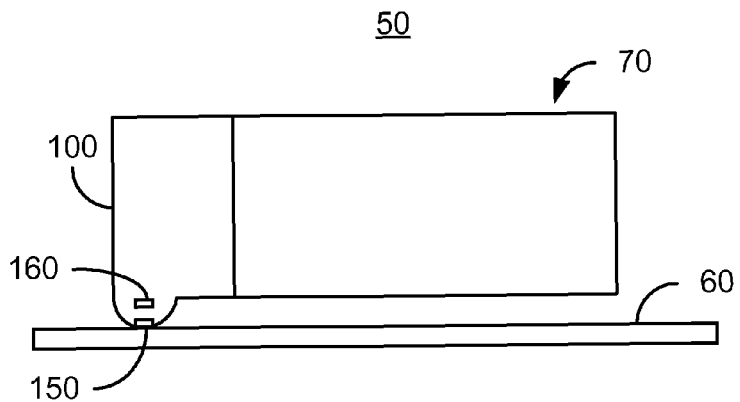
FIG. 1 is a diagram of a portion of an exemplary embodiment of a disk drive including a touchdown sensor integrated into the head.

FIG. 1 is a diagram of a portion of an exemplary embodiment of a disk drive 50. For simplicity, components are omitted. In addition, for clarity, FIG. 1 is not drawn to scale. The disk drive 50 includes a media 60 and a slider 70. On the slider 70 resides head 100, which includes integrated touchdown sensors 150 and 160. Each of the touchdown sensors 150 and 160 is a thermal sensor and, in one embodiment, is a thermistor.

The touchdown sensor 150 in combination with the touchdown sensor 160 detects touchdown based upon the temperature of the head 100. The disk drive 50 is shown at touchdown. Consequently, the head 100 contacts the media 60 in a region of the ABS termed a touchdown region. Frictional heating due to contact between the media 60 and head 100 raises the local temperature of the head 100 in the region proximate to where touchdown occurs. The touchdown sensor 150 is located in this touchdown region. Thus, the touchdown sensor 150 is able to detect a local temperature rise. This local temperature rise may persist due to relatively prolonged contact (for example in the tens of microsecond regime, or more) between the head 100 and disk 60 during touchdown.

In contrast, the touchdown sensor 160 is located distal from the portion of the ABS that is in contact with the media 60. The touchdown sensor 160 is thus substantially unaffected by the local temperature rise due to frictional heating in the touchdown region. However, the touchdown sensor 160 is otherwise exposed to similar conditions as the touchdown sensor 150. The touchdown sensor 160 may thus act as a reference sensor for the touchdown sensor 150. The touchdown sensor 160 is also desired to be integrated into the head 100 so that in the absence of touchdown, the touchdown sensor 160 is at or close to the same temperature as the touchdown sensor 150. A difference between the temperatures detected by the touchdown sensors 150 and 160 corresponds to contact between the head 100 and media 60. Stated differently, operation of the touchdown sensors 150 and 160 in a differential mode allows for touchdown detection for the head 100.

Figure 2:
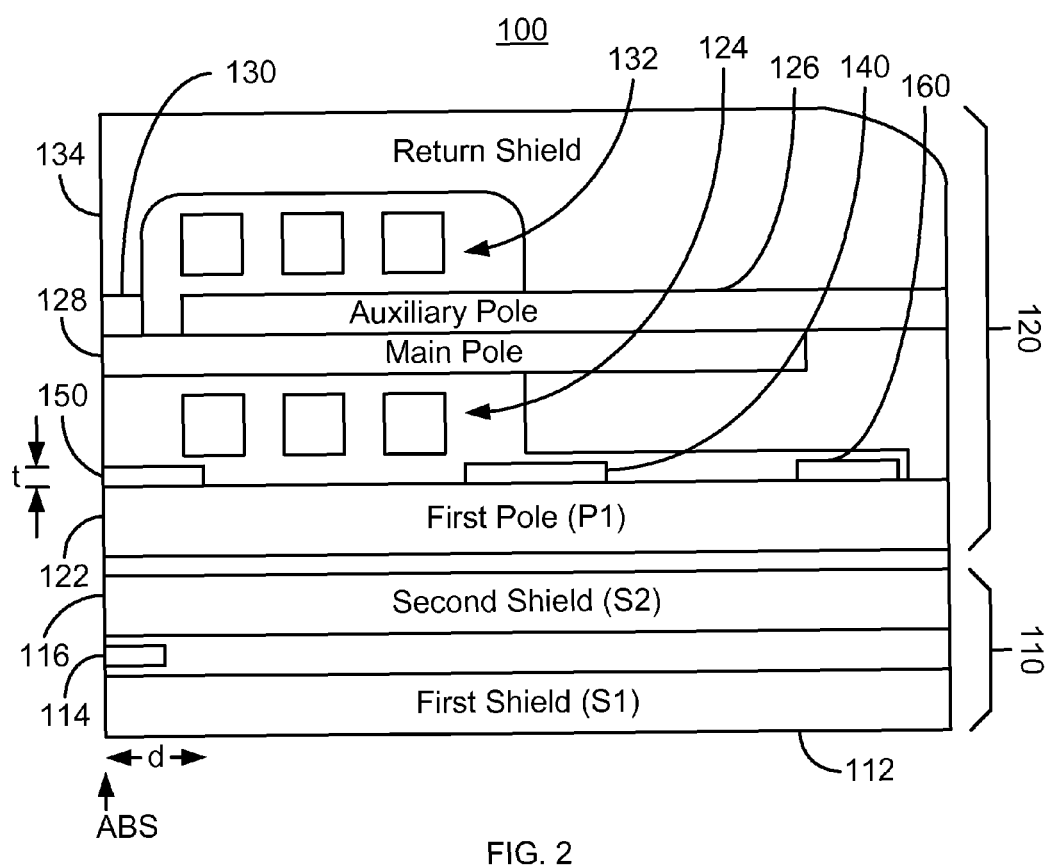
FIG. 2 depicts an exemplary embodiment of a head having a transducer including integrated touchdown sensors.

FIG. 2 depicts an exemplary embodiment of a portion of the magnetic head 100. For simplicity, components of the head 100 are omitted and the media 60 is not shown in FIG. 2. In addition, for clarity, FIG. 2 is not drawn to scale. The magnetic head 100 includes a magnetic read transducer 110 and write transducer 120. Referring to FIGS. 1-2, the head 100 may reside on the slider 70 of a disk drive 50. The head 100 is also described in the context of particular components and layers. However, in some embodiments, such layers may include sub-layer(s). In addition, some components may be moved, omitted, or combined with other components.

The read transducer 100 is used in reading from the media 60. The read transducer 110 includes shields 112 and 116 and sensor 114. The read sensor 114 may include a giant magnetoresistive sensor, such as a tunneling magnetoresistive junction. However, in other embodiments, the read sensor 114 may include other and/or additional components.

The write transducer 120 is used in writing to the media 60. The write transducer 140 includes a first pole 122, auxiliary pole 126, main pole 128, write gap 130, coils 124 and 132, and return shield 134. However, in another embodiment, the write transducer 120 other and/or different components. In addition, one or more portions of the write transducer 120 might be omitted in various embodiments. The first pole 122 is shown as separate from shield 116. However, in another embodiment, the second shield 116 and first pole 122 may be combined.

The head 100 also includes thermal actuator 140 and touchdown sensors 150 and 160. The thermal actuator 140 may be used to induce touchdown, as shown in FIG. 1, and otherwise control the spacing of the head 100 to the media 60. For example, a current may be driven through the thermal actuator 140, which generates heat in the region of the transducers 110 and 120. As a result, the transducers 120 and/or 110 may bulge outward toward the media 60, as shown in FIG. 1. When enough heat is generated by the thermal actuator 140, sufficient thermal protrusion occurs for intentional touchdown. This touchdown may be sensed by the touchdown sensors 150 and 160. Once touchdown is detected using the touchdown sensors 150 and 160, the thermal actuator 140 may be driven at a lower power in order to ensure that there is a desired space between the head 100 and media 60. Thus, use of the thermal actuator 140 allows the fly height to be selected and controlled.

The touchdown sensors 150 and 160 are used to detect touchdown of the head 100 on the media 60. In the embodiment shown, the touchdown sensors 150 and 160 are temperature sensors. In operation, both touchdown sensors 150 and 160 sense the increase in temperature of the transducer 120 due to heat generated by the thermal actuator 140 and other components of the head 100. Both touchdown sensors 150 and 160 may also be exposed to similar environmental conditions in the disk drive 50, such as humidity and altitude. Upon touchdown, frictional heating due to contact between the head 100 and media 60 causes a sharp increase, or jump, in the local temperature of the head 150 in the touchdown region. The temperature increase persists during touchdown. This is in contrast to a transient increase in temperature from transitory contact between the head 100 and media 60, for example due to asperities on the media 160. In contrast, the touchdown sensor 160 may not experience this temperature rise due to touchdown. As a result, there is a temperature difference between the touchdown sensor 150 and the touchdown sensor 160 that persists during touchdown. Detection of this temperature difference allows touchdown to be detected.

Figure 3:
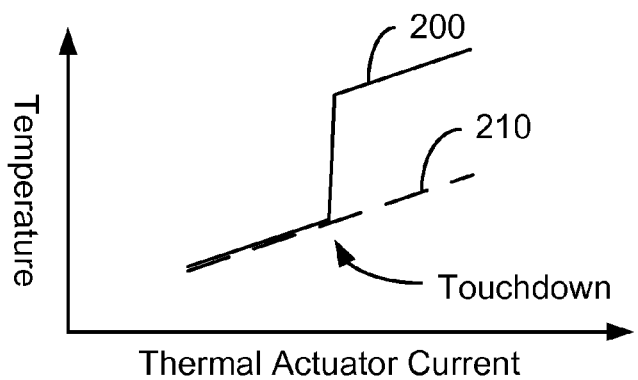
FIG. 3 depicts an exemplary embodiment of a graph depicting temperature versus heater current.

Operation of the touchdown sensors 150 and 160 may also be explained in connection with FIG. 3, which depicts the temperatures of the head versus actuator current. The graphs shown in FIG. 3 are for explanatory purposes only, and are not meant to depict actual temperatures in a particular head 100. The solid line 200 depicts temperature proximate to the ABS versus thermal actuator current, while the dashed line 210 depicts temperature distal from the ABS versus thermal actuator current. Referring to FIGS. 1-3, a higher current through the thermal actuator 140 generates more heat. Therefore, the temperature of the portion of the head 100 near the ABS increases with increasing thermal actuator current. This is shown in the portions of the lines 200 and 210 closer to the temperature axis. An increased temperature also corresponds to a larger thermal protrusion of the head 100 and, therefore, a smaller distance between the head 100 and media 60. When sufficient current is driven through the thermal actuator 140, thermal protrusion causes contact, or touchdown, between the media 60 and the head 100. Upon touchdown, frictional heating between the media 60 and head 100 causes a sharp increase in the local temperature of the head 100 in the touchdown region. This sharp increase is shown in the solid line 200 and labeled as corresponding to touchdown. However, to a large extent the sharp increase in temperature is not experienced distal from the touchdown region of the ABS. Consequently, dashed line 210 remains substantially unchanged. The increase in temperature in the touchdown region persists during touchdown as is also shown in FIG. 3. Stated differently the temperatures for higher thermal actuator currents than touchdown may be viewed as being due to heating from the actuator as well as frictional heating due to touchdown. This jump in temperature depicted by the solid line 200 may be sensed by the touchdown sensor 150. However, the touchdown sensor 160 senses a temperature analogous to the temperature depicted by the dashed line 210. Because different temperatures are sensed, the output signals of the touchdown sensors 150 and 160 differ. Subtracting the signal (or temperature) of the sensor 160 from the signal (or temperature) of the sensor 150 results in a smaller difference signal (or temperature difference). If this difference signal (or temperature difference) meets or exceeds a threshold, then touchdown may be determined to have occurred.

In the embodiment shown in FIGS. 1-2, the touchdown sensor 150 is exposed to the air-bearing surface (ABS). In another embodiment, the touchdown sensor 150 may be recessed from the ABS. The touchdown sensor 150 is, however, desired to be sufficiently close to the ABS to detect local temperature changes due to touchdown. For example, in one embodiment, the touchdown sensor 150 may be not more than ten to one hundred nanometers from the ABS. in another embodiment, the touchdown sensor 150 may be further from the ABS, for example up to one micron from the ABS. In contrast, the touchdown sensor 160 is distal from the ABS and thus does not detect local temperature changes due to touchdown. Other than touchdown, the touchdown sensors 150 and 160 are also desired to be exposed to substantially the same environment, including heat from the thermal actuator 140, as the transducers 110 and 120.

The touchdown sensors 150 and 160 are also desired to detect small temperature changes, be small in size, unaffected by magnetic fields generated during operation of the head 100, and not to adversely affect the read and write operations of the head 100. The touchdown sensors 150 and 160 are desired to be substantially unaffected by magnetic fields generated by the head 100 and media 60, allowing the touchdown sensors 150 and 160 to function as desired within the head 100. Alternatively, the effect of magnetic fields due to the head 100 and/or media 60 may cause well known and repeatable changes in the behavior of the touchdown sensors 150 and 160 that can be accounted for. Further, the touchdown sensors 150 and 160 should leave operation of the head 100 substantially unaffected.

Although the temperature change in the region of the touchdown sensor 150 may persist during touchdown, the temperature change may be small. In addition, the difference between temperatures at the touchdown sensors 150 and 160 may also be small. Consequently, the touchdown sensors 150 and 160 may be capable of detecting a temperature change as small as 0.1 degree Celsius. In some embodiments, the each touchdown sensor 150 and 160 may be capable of detecting smaller temperature changes. For example, in some embodiments, the touchdown sensor 150 and the touchdown sensor 160 may detect temperature changes of 0.01 degree Celsius. The touchdown sensor 150 may detect such changes that last for on the order of tens of microseconds or more.

In order to be integrated into the head 100, the touchdown sensors 150 and 160 are desired to be relatively small in size. In one embodiment, each touchdown sensor 150 and 160 has a depth, d, that extends approximately one micron perpendicular to the ABS (right to left in FIG. 2) and one micron along the ABS (perpendicular to the plane of the page in FIG. 2). However, in other embodiments, the touchdown sensors 150 and 160 may have other dimensions. For example, the touchdown sensor 150 and/or 160 might be 5 µm×5 µm in the directions discussed above. In other embodiments, the touchdown sensor 150 and/or 160 may be larger, particularly in a single dimension. For example, in one embodiment, the touchdown sensor 150 and/or 160 may be elongated to extend fifty micrometers perpendicular to the ABS and one to five microns along the ABS. The thickness, t, of the touchdown sensor 150 and/or 160 is desired to be small, for example five hundred nanometers or less. In one such embodiment, t is not more than three hundred nanometers. In one embodiment, t is two hundred fifty nanometers. Although shown as having the same geometry, in another embodiment, the touchdown sensors 150 and 160 may have differing geometries, sensitivities, and/or other characteristics.

In addition to the above features, each touchdown sensor 150 and 160 may have a negative thermal coefficient of resistivity. Thus, as the touchdown sensor 150 and/or 160 increases in temperature, its resistance decreases. As a result, the current through the touchdown sensor 150 and/or 160 would be concentrated in the hottest portion of the touchdown sensor 150 and/or 160, respectively. Consequently, the sensitivity of the touchdown sensor 150 and/or 160 in detecting a positive temperature change and, therefore, touchdown, may be increased. However, in another embodiment, a touchdown sensor 150 and/or a touchdown sensor 160 having a positive thermal coefficient of resistivity may be used.

Use of the touchdown sensors 150 and 160 allows for straightforward detection of touchdown through the detection of an increase in temperature. Improved detection of touchdown may be used in initial drive calibration, to provide a common touchdown detection technique applicable from test to product facilitating manufacturing, for routine checks and adjustments of dynamic fly height setting during operation of drive and to detect at inception problems from unintentional touchdown during drive operation. Improved touchdown detection may enhance calibration and adjustment of the drive 50. For example, better determination of the location of the media 60 through touchdown may enhance the ability of the disk drive 50 to fly the head 100 at a smaller controlled spacing from the media 60. Performance of the disk drive 50 may thus be improved. In addition, a lower fly height may allow the disk drive 50 to be used at higher storage densities. Further, yield for the disk drives may be improved. Similarly, detection of unintentional touchdown may allow for adjustment of the fly height and may thus enhance product reliability. For example, changes in operating environment and contamination of the head 100 may be accounted for. In addition, with appropriate selection of the touchdown sensors 150 and 160, manufacturing of the head 100 including the touchdown sensors 150 and 160 as well as modifications to existing circuitry to operate the touchdown sensors 150 and 160 may be relatively simple. In some embodiments, the function of the touchdown sensors 150 and 160 may be extended to detect temperature increases as the distance between the media 60 and head 100 decreases. In such an embodiment, the touchdown sensors 150 and 160 may be extended for use in a determination of the proximity of the head 100 to the media 60. Although use of the touchdown sensors 150 and 160 may require inclusion of an additional pad, the temperature difference, rather than absolute temperature may be measured for touchdown detection. Because the temperature difference is smaller in magnitude than the absolute temperature, detection may be further facilitated. For example, more accurate touchdown detection may be possible and simpler circuitry may be used.

Figure 4:
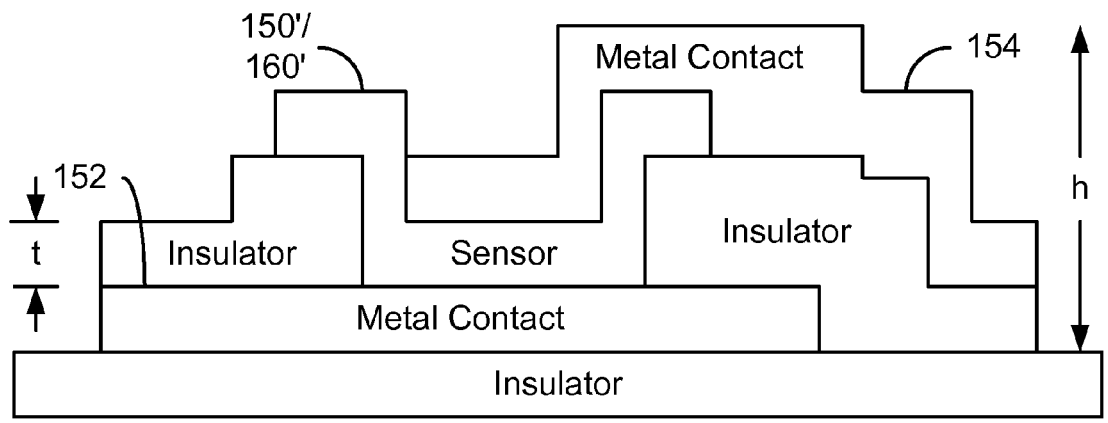
FIGS. 4-5 depict an exemplary embodiment of a touchdown sensor.
Figure 5:
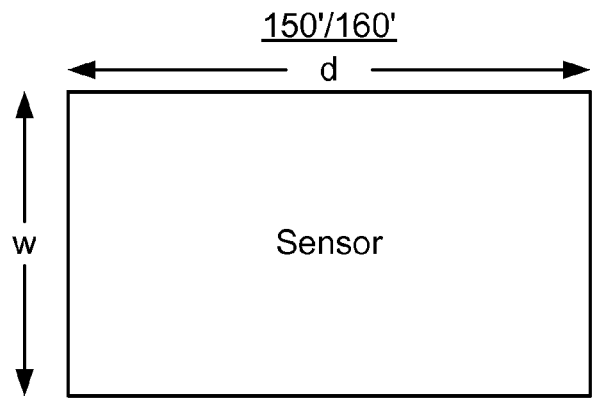

FIGS. 4-5 depict an exemplary embodiment of a touchdown sensor 150' or 160'. The touchdown sensor 150'/160' may be used for the touchdown sensor 150 or 160 depicted in FIGS. 1-2. Referring back to FIGS. 4-5, in addition to the actual sensor 150'/160', contacts 152 and 154 are also shown. The contacts 152 and 154 may be metallic, for example composed of Cr. The contacts 152 and 154 may be used to drive current through the sensor 150'/160', as well as read the resistance and thus temperature from the sensor 150'/160'.

In one embodiment, the sensor 150'/160' includes an amorphous semiconductor, such as one or more of amorphous Ge, amorphous Si, amorphous GeSi, and amorphous GeSiO. Such materials have high temperature sensitivity, allowing detection of temperature changes of 0.1 degree or less. Further, such materials provide this temperature sensitivity at a relatively small size. For example, sensor 150'/160' having width, w, and depth, d, on the order of a few microns or less may be fabricated. In the embodiment shown in FIG. 5, the width, w, is parallel to the ABS, while the depth, d, is perpendicular to the ABS. In some embodiments, the touchdown sensor 150'/160' may be substantially square, with both w and d on the order of five microns or less. For example, w and d may each be one micron. In another embodiment, the dimension w or d may be elongated, for example up to fifty microns. In addition, the thickness of the sensor 150'/160' may be small when using such amorphous semiconductors. In one embodiment, the thickness, t, may be not more than three hundred nanometers. In another embodiment, t may be not more than two hundred and fifty nanometers. The total height of the sensor 150'/160' and contacts 152 and 154, h, may be on the order of five hundred nanometers or less. In one such embodiment, h is not more than four hundred fifty nanometers. Thus, sensor 150'/160' that are small in size may be fabricated. Such amorphous semiconductors may also have a negative temperature coefficient of resistivity. As a result, the resistance of the sensor 150'/160' may decline as its temperature increases. Current is thus concentrated on the hottest portion of the sensor 150'/160', which may increase the sensitivity of the sensor 150/160', respectively'. In addition, use of amorphous semiconductors for the sensor 150'/160' allows the sensor to be fabricated using known photolithographic and similar techniques. However, in another embodiment, the sensor 150'/160' may include another material, such as a temperature sensitive metal. Further, in another embodiment, the configuration of the sensor 150'/160' and contacts 152 and 154 may be different. In one such embodiment, the contacts 152 and 154 may reside in substantially the same plane. In such an embodiment, the current would be driven through the sensor 150'/160' in this plane.

The sensor 150'/160' may thus be used in the head 100 for detecting touchdown. Use of the sensor 150'/160' may provide improved detection of touchdown. As a result, operation, reliability and manufacturing yield of the disk drives 50 may be improved.

Figure 6:
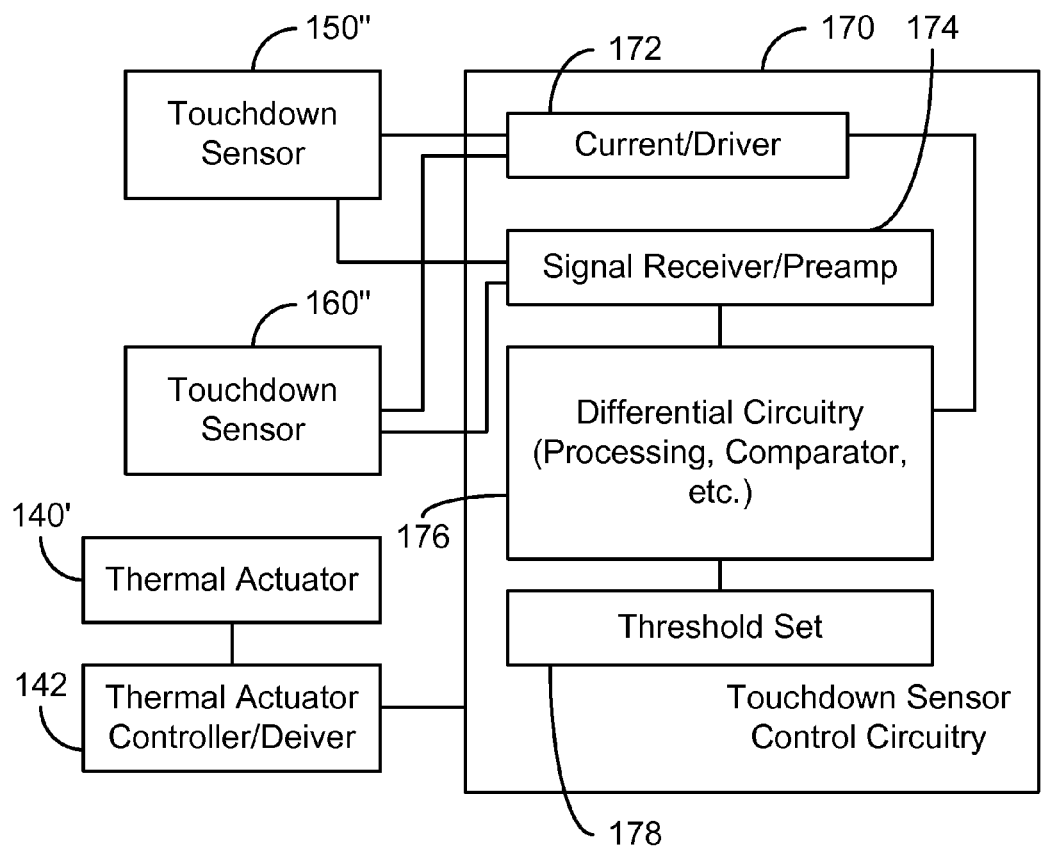
FIG. 6 depicts a block diagram an exemplary embodiment of a system for detecting touchdown using touchdown sensors integrated into a head.

FIG. 6 depicts a block diagram an exemplary embodiment of a system for detecting touchdown including a touchdown sensors 150" and 160" and touchdown sensor control circuitry 170. The touchdown sensors 150" and 160" are analogous to the touchdown sensors 150150' and 160/160', respectively. The touchdown sensors 150" and 160" may thus be integrated in the head 100 and have the properties described above. Components of the control circuitry 170 may be specially included in the disk drive 50 or may also be used for other purposes such as read or write operations.

The control circuitry 170 includes current/driver 172, signal receiver 174, differential circuitry 176, and threshold setting block 178. Note that the components 172, 174, 176, and 178 may include multiple functions and thus may have multiple sub-components. Such sub-components might be split into separate components. The current/driver 172 drives the touchdown sensors 150" and 160". In the embodiment shown, the current/driver 172 provides a current to the touchdown sensors 150" and 160". In another embodiment, the current/driver 172 might provide a voltage or otherwise drive the touchdown sensors 150" and 160". In another embodiment, separate current drivers may be used for the touchdown sensors 150" and 160". The signal receiver/preamp 174 receives output signals from the touchdown sensors 150" and 160". In one embodiment the signal receiver/preamp 174 may include the preamplifier for the read sensor 114 or other circuitry used by the head 100. In addition, separate signal receivers/preamps may be used for each touchdown sensor 150" and 160". In another embodiment, differential voltage or analogous differential signals may be read from the touchdown sensors 150" and 160". The differential circuitry block 176 may process the signals from the touchdown sensors 150" and 160". For example, the signals from the touchdown sensors 150" and 160" may be subtracted and the difference compared to a threshold. The threshold may be provided via threshold setting block, 178. Thus, the block 176 may determine whether the signal from the touchdown sensor 150" indicates a sufficiently large change in temperature for a sufficient interval for touchdown to be detected. Thus, through the use of the touchdown sensors 150" and 160" and control circuitry 170, touchdown may be detected.

FIG. 6 also depicts thermal actuator 140' and thermal actuator controller/driver 142. The thermal actuator controller/driver 142 may also include multiple subcomponents. The thermal actuator controller/driver 142 receives the signal from the touchdown sensor control circuitry 170 and determines the desired level of current to be driven through the thermal actuator 140'. The thermal actuator controller/driver 142 also provides the desired level of current to the thermal actuator 140'. The thermal actuator 140' corresponds to the thermal actuator 140 in the head 100. Thus, the thermal actuator 140' heats the head 100 a desired amount.

In operation, when intentional touchdown is to be detected, the thermal actuator 140' is driven at increasing current. The touchdown sensor 150" detects a sharp increase in temperature when touchdown occurs. However, the touchdown sensor 160" detects a temperature that does not undergo a similar jump upon touchdown. Based on the difference in the output signals from the touchdown sensors 150" and 160", the control circuitry 170 determines that touchdown has occurred. This may be achieved by comparing the difference in the sensed temperatures to a threshold. Temperature differences at or greater than the threshold may be considered to correspond to touchdown. The thermal actuator controller/driver 142 may then react, for example by reducing the current to the thermal actuator 140'. The thermal actuator 140' is driven at a lower power, and the heat in the head 100 reduced. Consequently, the head 100 may fly at a small, controlled spacing above the media.

Using the system including touchdown sensor 50" and control circuitry 170 detection of touchdown may be improved. As a result, operation, reliability and manufacturing yield of the disk drives 50 may be improved.

Figure 7:
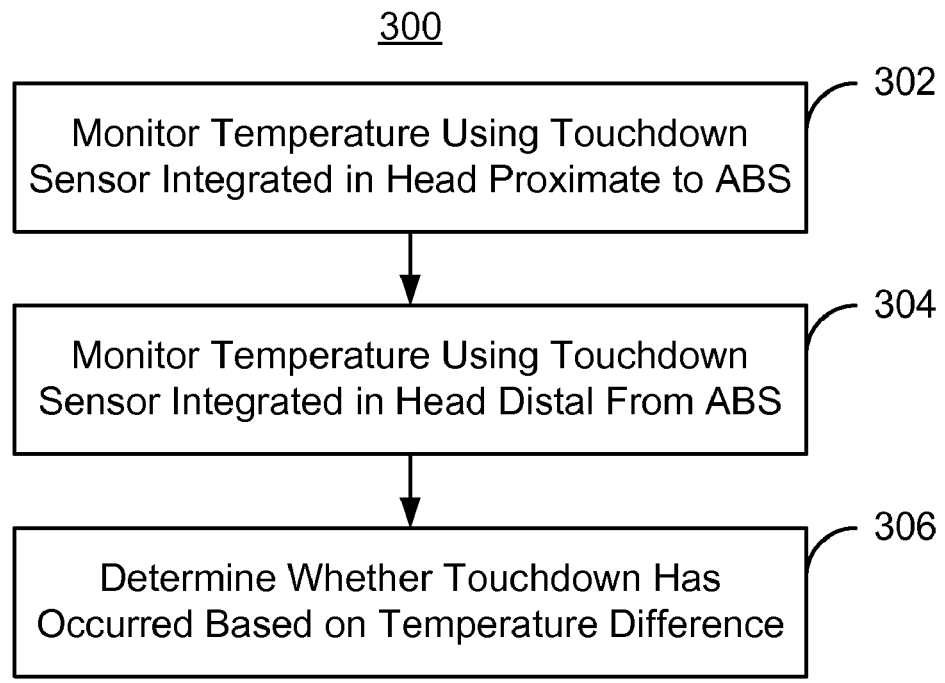
FIG. 7 depicts an exemplary embodiment of a method for detecting touchdown using touchdown sensors integrated into a head.

FIG. 7 depicts an exemplary embodiment of a method 300 for detecting touchdown using a touchdown sensor integrated into a head. The method 300 is used in connection with the head 100, touchdown sensor 150/150'/150", and touchdown sensors 160/160'/160". Further, although depicted as a flow of single steps, the steps of the method 300 may be performed in parallel and/or continuously.

The temperature of the head 100 in the touchdown region of the ABS is monitored, via step 302. Step 302 may be performed continuously during calibration or operation of the disk drive 50 using the touchdown sensor 150/150'/150". The temperature of the head 100 in the region distal from the touchdown region of the ABS is monitored, via step 304. Step 304 may be performed continuously during calibration or operation of the disk drive 50 using the touchdown sensor 160/160'/160". Alternatively steps 302 and 304 could be replaced by monitoring of the temperature difference between the touchdown region and a portion of the head 100 distal from the ABS. It is determined whether touchdown has occurred based on the difference between the temperatures monitored in steps 302 and 304, via step 306.

Figure 8:
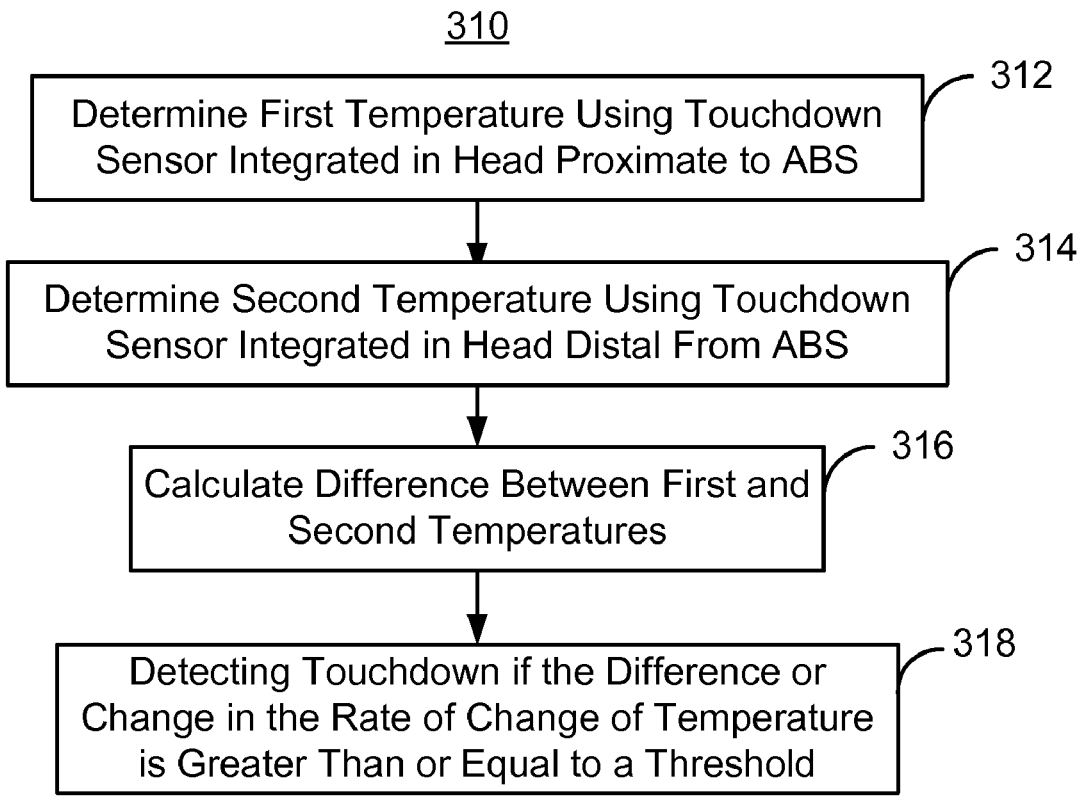
FIG. 8 depicts another exemplary embodiment of a method for detecting touchdown using touchdown sensors integrated into a head.

FIG. 8 depicts another exemplary embodiment of a method 310 for detecting touchdown using touchdown sensors integrated into a head. The method 310 is used in connection with the head 100, touchdown sensor 150/150'/150", and touchdown sensor 160/160'/160". Consequently, the method 310 is described in connection with the head 100 and touchdown sensors 150/150'/150" and 160/160'/160". Further, although depicted as a flow of single steps, the steps of the method 310 may be performed in parallel and/or continuously. The method 310 may also be viewed as an embodiment of the method 300.

A first temperature of the head 100 is detected using the temperature sensor 150/150'/150" integrated in the head 100, via step 312. The temperature sensor is proximate to the ABS and capable of detecting a temperature change of 0.1 degree. A second temperature is also detected using the temperature sensor 160/160'/160", via step 314. The second temperature is thus monitored distal from the ABS. Steps 312 and 314 may be performed multiple times in order to obtain trends in the temperature of the head 100. In addition, although described as temperature detection, steps 312 and 314 may simply include the temperature sensors 150/150'/150" and 160/160'/160" providing to the circuitry 170 signals corresponding to temperatures proximate to and distal from the ABS. Alternatively steps 312 and 314 may be replaced by monitoring the difference between the temperatures sensed by the temperature sensor 150/150'/150" and the sensor 160/160'/160".

A difference between the first temperature and the second temperature is calculated, via step 316. In one embodiment, step 316 is performed by the component 176. Step 316 may include determining an actual temperature difference, or simply determining the difference in signals from the temperatures sensor 150/150'/150". Note that if the temperature difference is monitored in lieu of steps 312 and 314, step 316 may be omitted.

Touchdown is determined to have occurred if the difference in temperatures or a change in the rate of change in temperature with actuator current is at least a threshold, via step 318. In one embodiment, step 318 detects occurrence of a touchdown if the difference or the change in the rate of change in temperature is greater than the threshold. In one such embodiment, touchdown is determined to have happened if the difference or the change in the rate of change in temperature meets or exceeds the threshold for a certain amount of time. Thus, touchdown may be detected.

Using the method 300 and/or 310 the temperature sensors 150/150'/150" and 160/160'/160" may be used to detect touchdown. As a result, detection of touchdown may be improved. Operation, reliability and manufacturing yield of the disk drives 50 may thus be improved.

We claim:

1. A disk drive comprising:
    a slider;
    a head residing on the slider and having an air-bearing surface (ABS), a portion of the ABS contacting a medium during a touchdown, the head further including a plurality of touchdown sensors, a first touchdown sensor proximate to the ABS, a second sensor distal from the ABS, the plurality of touchdown sensors capable of detecting a temperature change of 0.1 degree Celsius.

2. The disk drive of claim 1 wherein the first touchdown sensor is configured to sense a first temperature and the second touchdown sensor is configured to sense a second temperature, the disk drive further comprising:
    differential circuitry coupled with the first touchdown sensor and the second touchdown sensor configured to determine a difference between the first temperature and the second temperature.

3. The disk drive of claim 2 further comprising
    touchdown sensor control circuitry coupled with the plurality of touchdown sensors and including the differential circuitry, the touchdown sensor control circuitry for driving at least one current through the plurality of touchdown sensors and converting a signal from the differential circuitry to an indication of whether the touchdown has occurred.

4. The disk drive of claim 1 the first touchdown sensor is configured to sense a first temperature and the second touchdown sensor is configured to sense a second temperature, the disk drive further comprising:
    further comprising differential circuitry for monitoring a difference between the first temperature and the second temperature.

5. The disk drive of claim 1 wherein at least one of the first touchdown sensor and the second touchdown sensor is a thermistor.

6. The disk drive of claim 5 wherein at least one of the first touchdown sensor and the second touchdown sensor includes a metal.

7. The disk drive of claim 5 wherein the at least one of the first and second touchdown sensors includes a first metal layer, and a second metal layer, a portion of the at least one amorphous semiconductor residing between a portion of the first metal layer and a portion of the second metal layer.

8. The disk drive of claim 1 wherein at least one of the first touchdown sensor and the second touchdown sensor includes at least one amorphous semiconductor.

9. The disk drive of claim 8 wherein the at least one amorphous semiconductor includes at least one of Ge, Si, GeSi, and GeSiO.

10. The disk drive of claim 1 wherein each of the plurality of touchdown sensors is capable of detecting the temperature change of 0.01 degree Celsius.

11. The disk drive of claim 1 wherein each of the plurality of touchdown sensors has a lateral dimension of not more than fifty microns.

12. The disk drive of claim 11 wherein the lateral dimension is not more than one micron.

13. The disk drive of claim 1 wherein each of the plurality of touchdown sensors has a thickness of not more than five hundred nanometers.

14. The disk drive of claim 1 wherein each of the plurality of touchdown sensors has a negative thermal coefficient of resistivity.

15. The disk drive of claim 1 wherein at least one of the first touchdown sensor and the second touchdown sensor has a positive thermal coefficient of resistivity.

16. A disk drive comprising:
    a slider;
    a head residing on the slider and having an air-bearing surface (ABS), a portion of the ABS contacting a medium during a touchdown, the head further including a first touchdown sensor proximate to the ABS and a second sensor distal from the ABS, the first touchdown sensor and the second touchdown sensor including at least one of amorphous Ge, Si, GeSi, and GeSiO, each of the first and second touchdown sensors further including a first metal layer, and a second metal layer, a portion of the at least one amorphous semiconductor residing between a portion of the first metal layer and a portion of the second metal layer, each of the first touchdown sensor and the second touchdown sensor capable of detecting a temperature change of 0.1 degree Celsius and having a lateral dimension of not more than one micron; and
    differential circuitry coupled with the first touchdown sensor and the second touchdown sensor configured to determine a difference between the first temperature and the second temperature.

17. A method for detecting a touchdown between a head having an air-bearing surface (ABS) and a disk in a disk drive, the method comprising:
    determining a first temperature of a first touchdown sensor integrated in the head, the first touchdown sensor being proximate to the ABS and capable of detecting a temperature change of 0.1 degree Celsius;
    determining a second temperature of a second touchdown sensor integrated in the head, the second touchdown sensor being distal from the ABS and capable of detecting the temperature change;
    calculating a difference between the first temperature and the second temperature; and
    detecting the touchdown based on the difference.

18. The method of claim 17 wherein the step of detecting further includes:
    detecting the touchdown if the difference is at least a threshold.

19. The method of claim 17 wherein the step of detecting further includes:
    detecting the touchdown if a change in a rate of change of temperature is at least a threshold.

20. The method of claim 17 wherein at least one of the first touchdown sensor and the second touchdown sensor is a thermistor.

21. The method of claim 17 wherein at least one of the first touchdown sensor and the second touchdown sensor includes at least one amorphous semiconductor.

22. The method of claim 21 wherein the at least one amorphous semiconductor includes at least one of Ge, Si, GeSi, and GeSiO.

23. The method of claim 21 wherein the at least one of the first and second touchdown sensors includes a first metal layer, and a second metal layer, a portion of the at least one amorphous semiconductor residing between a portion of the first metal layer and a portion of the second metal layer.

24. The method of claim 17 wherein at least one of the first touchdown sensor and the second touchdown sensor includes a temperature sensitive metal.

25. The method of claim 17 wherein the first touchdown sensor has a first negative thermal coefficient of resistivity and the second touchdown sensor has a second negative thermal coefficient of resistivity.

* * * * *